United States Patent Office 3,341,566
Patented Sept. 12, 1967

3,341,566
PROCESS FOR THE MANUFACTURE OF ORGANIC NITRILES
Toshio Nakaoka, Suginami-ku, Tokyo, and Kozo Sonobe, Sadao Suganuma, and Eiji Mori, Edogawa-ku, Tokyo, Japan, assignors to Nippon Chemical Industrial Co., Ltd., Tokyo, Japan, a corporation of Japan
No Drawing. Filed July 1, 1964, Ser. No. 379,735
Claims priority, application Japan, July 5, 1963, 38/34,467; Mar. 23, 1964, 39/15,675
6 Claims. (Cl. 260—465)

The present invention relates to a process for the manufacture of organic nitriles.

In U.S. patent specification No. 3,012,059, there has been described a process for the manufacture of organic nitriles wherein phosphonitrilic chloride is reacted with an alkali or alkaline earth metal salt of an aliphatic or aromatic carboxylic acid at a temperature of 100 degrees to 200 degrees C. The above reaction is shown by the following Equation I:

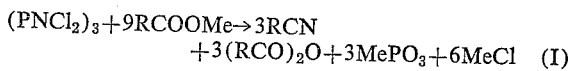
$$+3(RCO)_2O+3MePO_3+6MeCl \quad (I)$$

Here and elsewhere herein R is an alkyl or aryl radical, substituted or unsubstituted. Here Me is an alkali or an alkaline earth metal. And also it was been stated that, in this reaction, nitriles can be obtained even if the molar ratio of $(PNCl_2)_3$:RCOOMe in the above reaction formula is 1:1, but the most effective molar ratio is 1:9 and that, if the molar ratio of alkali or alkaline earth metal of aliphatic or aromatic carboxylic acid to phosphonitrilic chloride is lower than the above effective molar ratio, by-products such as the corresponding acid chloride is formed and, as a result, the yield of nitrile is decreased.

As clear from the reaction (I), in the above process only 1 mol of nitrile RCN results from use of three mols of the metal salt of carboxylic acid.

According to the present invention, the metal salt in Equation I is replaced in part at least by an ammonium salt of a carboxylic acid or in part only by an ammonium salt of an inorganic acid as in Examples 21 and 22 or an amide as in Examples 25, 29 and 41, each replacement, whether a compound or a mixture, serving as an additional nitrogen-containing composition. The proportion of the ammonium salt used in Equation III is 1 mole, containing 1 nitrogen atom, for an amount of the phosphonitrilic chloride that, as in Equation II, supplies 2 nitrogen atoms. Examples 1–5 use the proportion of approximately 3 moles of an ammonium salt, and Example 25 uses about 2.6 moles of urea and 0.6 mole of sodium 2-hydroxy-3-methylbenzoate for said amount of the phosphonitrilic chloride.

In general, when phosphonitrilic chloride is reacted with the metal salt of a carboxylic acid, the nitrile and by-products are formed according to the following equation:

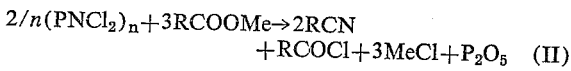
$$+RCOCl+3MeCl+P_2O_5 \quad (II)$$

The *n* here and elsewhere herein is an integral number at least 3. Me here and later herein represents an atom of an alkali metal.

According to the process of the present invention, the acid chloride as formed is effectively converted into nitrile by the nitrogen-containing compound, such as the ammonium salt present in the reaction II. This is shown in the following Equation III:

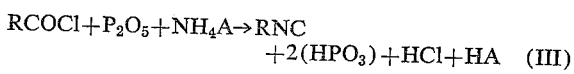
$$+2(HPO_3)+HCl+HA \quad (III)$$

wherein A is an inorganic or an organic radical corresponding to RCOO—.

Actually, all materials are mixed at the start, so that reactions II and III occur at the same time. Whether the by-products, the acid chloride RCOCl and phosphorus pentoxide $P_2O_5$, ever appear is immaterial; they are either absent or present in greatly decreased amounts in the final reacted mixture. The reactions II and III are stated separately only to show what we consider the mechanism by which the overall result is achieved.

In one embodiment, the sodium acetate is replaced by 3 mols of ammonium acetate or other ammonium salt, making the total mols of ammonium salts used 4 for 2 of $PNCl_2$ in reactions II and III.

Proportions of reactants that are recommended for commercial use are approximately stoichiometric. Variations from such proportions may be made, however, at the sacrifice of some unused part of the material introduced in excess.

In case an ammonium salt of carboxylic acid is used in the process of the present invention, ammonium chloride is formed in the reaction (III) in place of the HCl. As a result, the addition of an amide is not necessary; the ammonium salt itself being the nitrogen source for the formation of nitrile.

The nitrogen-containing compound to be used can be ammonium salts such as ammonium chloride, sulfate, carbonate, carbamate, and diammonium hydrogen phosphate, an ammonium salt of any aliphatic or aromatic carboxylic acid, and amides of phosphoric acids and urea.

Examples of the chlorides that we use are the tri- and tetra-phosphonitrilic chloride, other (higher) polymeric phosphonitrilic chlorides and mixtures thereof. These chlorides of the formula $(PNCl_2)_{3-7}$ are crystalline in the tri- or tetramer or other polymers of higher molecular weight. Above the heptamer they are oily materials.

The carboxylic acid, which we use in the form of the alkali, metal or ammonium salt, is any substituted or unsubstituted aliphatic or aromatic carboxylic acid. When the acid is hydroxybenzoic, yields of the nitrile average higher when the acid is unsubstituted in the 2- or ortho position than when substituted in that position. (Compare, in Table I, Examples 11 and 12, 14 and 17, and 16 and 17. But see also 8 and 9.)

Our reactions can be conveniently carried out by milling and mixing the above starting materials, including the nitrogen-containing compound, and heating the resulting mixture as such or, if necessary to lower the liquifying temperature, in the presence of a solvent. The heating temperature, when the salts used are those of lower aliphatic acids such as acetic and propionic acids, may be 100 degrees to 200 degrees C., but some salts, derivatives of benzoic acid and its substitution products require higher temperatures, e.g. 400 degrees to 600 degrees C. The reaction product can be separated in the pure form by conventional means, examples being direct or vacuum distillation or extraction of it with a usual solvent.

The present invention is illustrated by the following examples in which parts are by weight, except where stated also as the approximate number of mols, the phosphonitrilic chloride being calculated as mols of monomer units represented, as in the trimer or tetramer.

*Example 1*

231 parts (3 mols) of ammonium acetate were mixed with 230 parts (2 mols) of triphosphonitrilic chloride. The mixture was charged into a reactor provided with a reflux condenser and heated while protected from outside moisture. When the temperature had reached 120 degrees C., a reaction suddenly began, with generation of hydrogen chloride gas. When the temperature was raised to 180 degrees C., by further heating, refluxing began while hydrogen chloride gas was generated. The refluxing was carried out at a temperature of 200 degrees to 230 degrees C. for six hours. Then the generation of hydrogen chloride gas in substantial amount had ceased. The mixture was thereafter distilled, and 300 parts of a fraction, distilled at a temperature of 75 degrees to 90 degrees C., was collected and then rectified to obtain 253 parts (68.5%) of acetonitrile: B.P. 81 degrees to 83 degrees C.

Example 2

125 parts (0.9 mol) of ammonium benzoate and 70 parts (0.6 mol) of mixed triphosphonitrilic chloride crystals and tetraphosphonitrilic chloride crystals were ground and mixed together and the mixture was charged into a reactor provided with a reflux condenser and was heated while protected from moisture. When the temperature reached 120 degrees C. a part of mixture was molten and when the temperature was raised over 180 degrees C. a reflux was started while hydrogen chloride gas was vigorously generated. When the mixture was heated for three hours while the temperature was maintained at 240 degrees C., the generation of hydrogen chloride gas almost ceased and the content of reactor was separated in two phases, namely liquid phase and solid phase.

The reaction product was distilled at a temperature of 81 degrees to 84 degrees C. under the pressure of 20 mm. Hg to yield 65 parts (70.5%) of benzonitrile.

Example 3

465 parts (3 mols) of ammonium parahydroxybenzoate were well mixed with 230 parts (2 mols) of phosphonitrilic chloride consisting of tri- tetra- and other poly-phosphonitrilic chlorides and the mixture was charged into a reactor and then heated. When the temperature was raised from 150 degrees to 170 degrees C., reaction proceeded without generation of hydrogen chloride gas and the content of the reactor became a uniform semi-molten mass. When the mass was heated up to the temperature of 500 degrees C. for as short a time as possible, paracyanophenol distilled out together with by-product ammonium chloride, while hydrogen chloride gas was vigorously generated.

The distillate was treated with a hot benzol to extract paracyanophenol. 262 parts (73%) of paracyanophenol (melting point: 113 degrees C.) were obtained by the distilling out of benzol.

Example 4

104 parts of ammonium ortho chlorobenzoate were well mixed with 46 parts of phosphonitrilic chloride consisting of tri-, tetra- and other poly-phosphonitrilic chlorides and the mixture was heated in a reactor from 180° to 240° C. while moisture was excluded. Hydrochloric acid gas was vigorously generated at a temperature of more than 200° C. and the reaction was completed in about ninety minutes. After cooling, the reaction product was extracted with carbon tetrachloride. 72 parts of orthochlorobenzonitrile were obtained by removing carbon tetrachloride from the extract. 65 parts (80%) of pure orthochlorobenzonitrile (melting point: 45° to 46° C.) were obtained by a vacuum distillation.

Example 5

552 parts of ammonium paranitrobenzoate were mixed with 230 parts of phosphonitrilic chloride consisting of tri-, tetra- and other poly-phosphonitrilic chlorides and the mixture was heated at a temperature of 240° to 260° C. The reaction mixture thus obtained was mixed with water and then was heated to dissolve water-soluble matter from reaction mixture into the water. After cooling, the water-insoluble crystals were collected and was recrystallized from ethanol to obtain 410 parts (93%) of paranitrobenzonitrile (melting point: 140° C.).

Examples 6 to 20

Organic nitriles were manufactured from ammonium carboxylates having various substituents by a similar operation as described in Examples 1 to 5. The results thus obtained are shown in Table I.

In these examples, a mixture of chlorotriphosphonitrilic chloride crystals and tetraphosphonitrilic chloride crystals was used in an amount providing a total of 2 nitrogen atoms in every case for 3 mols of the ammonium salts used, each of which provides 1 nitrogen atom.

TABLE I

| Example No. | Ammonium Salt Used | Method Example No. | Temperature, °C. | Product | B.P. or M.P. | Yield (percent) |
|---|---|---|---|---|---|---|
| 6 | $C_2H_5COONH_4$ | 1 | 180–220 | $C_2H_5CN$ | B.P., 95–98° C. | 63 |
| 7 | $CH_3$–⟨⟩–$COONH_4$ | 4 | 200–240 | $CH_3$–⟨⟩–$CN$ | M.P., 29° C. | 57 |
| 8 | $Cl$–⟨⟩–$COONH_4$ | 4 | 200–240 | $Cl$–⟨⟩–$CN$ | M.P., 92° C. | 77 |
| 9 | Cl (ortho)–⟨⟩–$COONH_4$ | 4 | 180–220 | Cl (ortho)–⟨⟩–$CN$ | M.P., 46° C. | 80 |
| 10 | $Cl$,Cl–⟨⟩–$COONH_4$ | 4 | 220–240 | $Cl$,Cl–⟨⟩–$CN$ | M.P., 73° C. | 81 |
| 11 | $O_2N$–⟨⟩–$COONH_4$ | 5 | 240–260 | $O_2N$–⟨⟩–$CN$ | M.P., 147° C. | 93 |
| 12 | $NO_2$ (ortho)–⟨⟩–$COONH_4$ | 5 | 180–200 | $NO_2$ (ortho)–⟨⟩–$CN$ | M.P., 109–110° C. | 45 |
| 13 | $NO_2$,$Cl$–⟨⟩–$COONH_4$ | 5 | 240–260 | $NO_2$,$Cl$–⟨⟩–$CN$ | M.P., 100–101° C. | 91 |

TABLE I—Continued

| Example No. | Ammonium Salt Used | Method Example No. | Temperature, °C. | Product | B.P. or M.P. | Yield (percent) |
|---|---|---|---|---|---|---|
| 14 | 2-hydroxybenzoate ammonium (OH, COONH₄) | 3 | 350–400 | 2-hydroxybenzonitrile (OH, CN) | M.P., 95° C | 58 |
| 15 | 3-methyl-2-hydroxybenzoate ammonium (CH₃, OH, COONH₄) | 3 | 400–450 | 3-methyl-2-hydroxybenzonitrile (CH₃, OH, CN) | M.P., 86–87° C | 60 |
| 16 | 5-chloro-2-hydroxybenzoate ammonium (OH, COONH₄, Cl) | 3 | 400–450 | 5-chloro-2-hydroxybenzonitrile (OH, CN, Cl) | M.P., 166–167° C | 55 |
| 17 | 4-hydroxybenzoate ammonium (OH, COONH₄) | 3 | 350–400 | 4-hydroxybenzonitrile (OH, CN) | M.P., 82° C | 93 |
| 18 | 3-nitro-4-hydroxybenzoate ammonium (OH, COONH₄, NO₂) | 3 | 400–450 | 3-nitro-4-hydroxybenzonitrile (OH, CN, NO₂) | M.P., 119–120° C | 49 |
| 19 | 3-chloro-4-hydroxybenzoate ammonium (Cl, HO, COONH₄) | 3 | 400–450 | 3-chloro-4-hydroxybenzonitrile (Cl, HO, CN) | M.P., 155° C | 85 |
| 20 | 3,5-dichloro-4-hydroxybenzoate ammonium (Cl, HO, COONH₄, Cl) | 3 | 400–450 | 3,5-dichloro-4-hydroxybenzonitrile (Cl, HO, CN, Cl) | M.P., 146° C | 83 |

Example 21

24.6 parts of sodium acetate, 25 parts of mixture consisting of tri-, tetra- and other poly-phosphonitrilic chlorides and 15 parts of ammonium carbonate were well milled and mixed together. The mixture was charged into a reactor provided with a cooler and heated on an oil bath. A reaction occurred vigorously at a temperature of more than 120° C. and the generations of carbon dioxide gas and hydrogen chloride gas ceased after refluxing for about two hours at the temperature of 220° C. After cooling, the reactor was provided with a distillation apparatus and then the reaction product was distilled to obtain 103 parts (84%) of acetonitrile which was distilled out at a temperature of 80° to 85° C.

Example 22

44 parts of sodium benzoate, 115 parts of mixture of phosphonitrilic chloride consisting of tri-, tetra and other poly-phosphonitrilic chlorides and 60 parts of ammonium chloride were treated as similar to Example 1. The reaction product was extracted with carbon tetrachloride and was distilled to obtain 78 parts (76%) of benzonitrile which distilled out at a temperature of 88° to 91° C.

Example 23

66 parts of calcium 3-nitro-4-chlorobenzoate, 30 parts of triphosphonitrilic chloride and 50 parts of ammonium sulfate were milled and mixed the mixture was treated in similar to Example 1. The reaction was carried out at the temperature of 260° C., and thereafter the reaction product was extracted with carbon tetrachloride to obtain 52 parts of crude product. 48 parts (86%) of pure 3-nitro-4-chlorobenzonitrile of melting point of 100° to 101° C. by recrystallizing the crude product from water.

Example 24

50 parts of sodium parahydroxybenzoate, 48 parts of ammonium parahydroxybenzoate 73 parts of mixture consisting of triphosphonitrilic chloride crystal and tetraphosphonitrilic chloride crystal and 41 parts of ammonium dihydrogen phosphate were milled and mixed when the mixture was charged into a reactor provided with a cooler and the reactor was inserted into an electric furnace which was maintained at the temperature of 500° C., paracyanophenol was distilled out together with a by-produced ammonium chloride with a generation of hydrogen chloride gas. The paracyanophenol thus obtained was extracted with a hot benzene to obtain 63 parts (84%) of paracyanophenol (melting point of 113° C.).

Example 25

Example 24 was repeated except that as starting materials 52.5 parts of sodium 2-hydroxy-3-methyl benzoate, 30 parts of triphosphonitrilic chloride and 20 parts of urea were used. There were obtained 21 parts (51%) of 2-hydroxy-3-methylbenzonitrile (melting point 84° to 85° C.).

Examples 26 to 52

Organic nitriles were manufactured from various carboxylic acids and various ammonium salts by a similar operation as described in Examples 21 to 25. The results thus obtained are shown in Table II.

TABLE II

| Example No. | Salts or Amide Used — Carboxylic acid | Salts or Amide Used — Metal | Salts or Amide Used — Ammonium or amide compound | Method Example No. | —NH₄ or —NH₂ RCOOMe | PNCl₂ RCOOMe | Reaction temperature, °C | Product | Yield |
|---|---|---|---|---|---|---|---|---|---|
| 26 | C₆H₅—COOH | —Na | NH₄Cl | 24 | 0.5 | 0.7 | 200–220 | C₆H₅—CN | 74 |
| 27 | C₆H₅—COOH | —Na | (NH₄)₂SO₄ | 24 | 1 | 0.67 | 200–220 | C₆H₅—CN | 76 |
| 28 | C₆H₅—COOH | —Na | (NH₄)₂HPO₄ | 24 | 1 | 0.67 | 200–220 | C₆H₅—CN | 78 |
| 29 | C₆H₅—COOH | —Na | OP(NH₂)₂ | 24 | 0.5 | 0.67 | 200–220 | C₆H₅—CN | 75 |
| 30 | C₆H₅—COOH | —K | NH₄Cl | 24 | 1 | 1 | 200–220 | C₆H₅—CN | 73 |
| 31 | C₆H₅—COOH | —Ca | NH₄Cl | 24 | 1 | 1 | 200–220 | C₆H₅—CN | — |
| 32 | C₆H₅—COOH | —Ca | (NH₄)₂HPO | 24 | 1 | 1 | 200–240 | C₆H₅—CN | 68 |
| 33 | C₆H₅—COOH | —Na | —COONH₄ | 24 | 1 | 0.67 | 200–240 | C₆H₅—CN | 70 |
| 34 | H₃C—C₆H₄—COOH | —Na | NH₄Cl | 24 | 1 | 0.67 | 200–220 | H₃C—C₆H₄—CN | 73 |
| 35 | H₃C—C₆H₄—COOH | —Na | (NH₄)₂HPO₄ | 24 | 1 | 0.67 | 200–220 | H₃C—C₆H₄—CN | 52 |
| 36 | Cl—C₆H₄—COOH | —Na | NH₄Cl | 24 | 1 | 0.67 | 210–230 | Cl—C₆H₄—CN | 53 |
| 37 | Cl-C₆H₃(Cl)—COOH | —Na | NH₄Cl | 24 | 1 | 0.67 | 200–240 | Cl-C₆H₃(Cl)—CN | 75 |
| 38 | O₂N—C₆H₄—COOH | —Na | NH₄Cl | 25 | 0.7 | 0.67 | 240–260 | O₂N—C₆H₄—CN | 78 |
| 39 | O₂N—C₆H₄—COOH | —Na | (NH₄)₂SO₄ | 25 | 0.7 | 0.67 | 240–260 | O₂N—C₆H₄—CN | 85 |
|  |  |  |  |  |  |  |  |  | 87 |

TABLE II—Continued

| Example No. | Carboxylic acid | Salts or Amide Used — Metal | Salts or Amide Used — Ammonium or amide compound | Method Example No. | —NH₄ or —NH₂ / RCOOMe | PNCl₂ / RCOOMe | Reaction temperature, °C. | Product | Yield |
|---|---|---|---|---|---|---|---|---|---|
| 40 | o-HO-C₆H₄-COOH | —Na | NH₄Cl | 26 | 1 | | 400–450 | o-HO-C₆H₄-CN | 42 |
| 41 | o-HO-C₆H₄-COOH | —Na | OP(NH₂)₃ | 26 | 0.5 | 0.67 | 400–450 | o-HO-C₆H₄-CN | 45 |
| 42 | m-HO-C₆H₄-COOH | —Na | NH₄Cl | 26 | 1 | 0.67 | 400–450 | m-HO-C₆H₄-CN | 83 |
| 43 | p-HO-C₆H₄-COOH | —Na | NH₄Cl | 26 | 1 | 1 | 400–450 | p-HO-C₆H₄-CN | 78 |
| 44 | p-HO-C₆H₄-COOH | —Na | NH₄Cl | 26 | 1 | 0.67 | 400–450 | p-HO-C₆H₄-CN | 83 |
| 45 | p-HO-C₆H₄-COOH | —Na | (NH₄)₂SO₄ | 26 | 1 | 1 | 400–450 | p-HO-C₆H₄-CN | 85 |
| 46 | p-HO-C₆H₄-COOH | —Na | HO-C₆H₄-COONH₄ | 26 | 1 | 1 | 400–450 | p-HO-C₆H₄-CN | 75 |
| 47 | p-HO-C₆H₄-COOH | —Na | (NH₂)₂CO | 26 | 1 | 1 | 400–450 | p-HO-C₆H₄-CN | 75 |
| 48 | p-HO-C₆H₄-COOH | —Ca | NH₄Cl | 26 | 1 | 1 | 450–480 | p-HO-C₆H₄-CN | 80 |
| 49 | p-HO-C₆H₄-COOH | —Ca | (NH₄)₂HPO₄ | 26 | 1 | 1 | 450–480 | p-HO-C₆H₄-CN | 82 |
| 50 | p-HO-C₆H₄-COOH | —K | NH₄Cl | 26 | 1 | 1 | 400–450 | p-HO-C₆H₄-CN | 85 |
| 51 | 3-Cl-4-HO-C₆H₃-COOH | —Na | (NH₄)₂HPO₄ | 26 | 1 | 1 | 450–500 | 3-Cl-4-HO-C₆H₃-CN | 75 |
| 52 | 3-Cl-4-HO-C₆H₃-COOH | —Na | (NH₄)₂HPO₄ | 26 | 1 | 1 | 450–500 | 3-Cl-4-HO-C₆H₃-CN | 78 |

What we claim is:

1. The process of making a nitrile which comprises forming a mixture of a phosphonitrilic chloride with an additional nitrogen-containing composition in amount to convert nitrogen of the mixture to an organic nitrile, said composition being an ammonium salt of a carboxylic acid or a mixture of an amide with an alkali metal salt of a carboxylic acid or with an ammonium salt of an inorganic acid, heating the final mixture to a temperature within the range 100°–600° C., to cause generation of hydrogen chloride and until the generation ceases, and then separating the resulting organic nitrile from the heated mixture.

2. The process of claim 1 in which the phosphonitrilic chloride is tri- or tetrameric and said additional nitrogen-containing composition is an ammonium salt or a mixture thereof with an alkali metal salt of a carboxylic acid.

3. The process of claim 2 in which said additional nitrogen-containing composition is ammonium acetate in the proportion of about 3 moles for an amount of the phosphonitrilic chloride containing 2 atoms of nitrogen.

4. The process of claim 1 in which the additional nitrogen-containing composition is a mixture of ammonium carbonate or chloride with a sodium salt of a carboxylic acid.

5. The process of claim 2 in which said additional nitrogen-containing composition is the ammonium salt of benzoic or Cl, OH, $NO_2$, $CH_3$ and $C_2H_5$ substituted benzoic acid.

6. The process of claim 1 in which said additional nitrogen-containing composition is a mixture of urea with an ammonium salt or with an alkali metal salt of a carboxylic acid.

References Cited
UNITED STATES PATENTS

| | | | |
|---|---|---|---|
| 2,206,351 | 7/1940 | Greenhalgh | 260—404 |
| 2,800,496 | 7/1957 | Toland | 260—465 |
| 3,012,059 | 12/1961 | Bezman | 260—465 |

CHARLES B. PARKER, *Primary Examiner.*

D. H. TORRENCE, *Assistant Examiner.*